J. L. Jones.
Combination Handle.

No. 86,759.  Patented Feb. 9, 1869.

Witnesses;
W. H. Mickle
Dexter Gillmore

Inventor;
J. Lewis Jones.

United States Patent Office.

J. LEWIS JONES, OF UTICA, NEW YORK.

Letters Patent No. 86,759, dated February 9, 1869.

IMPROVEMENT IN HANDLE FOR CASKS.

The Schedule referred to in these Letters Patent and making part of the same.

*To all whom it may concern:*

Be it known that I, J. LEWIS JONES, of Utica, in the county of Oneida, and State of New York, have invented a new and useful Combination Handle; and I do hereby declare that the following is a full, clear, and exact description of the construction and operation of the same, reference being had to the annexed drawings, making a part of this specification, in which—

Figure 1:
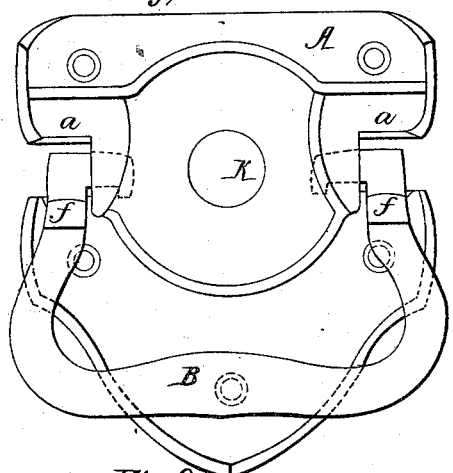

Figure 1 is a front elevation.

Figure 2:
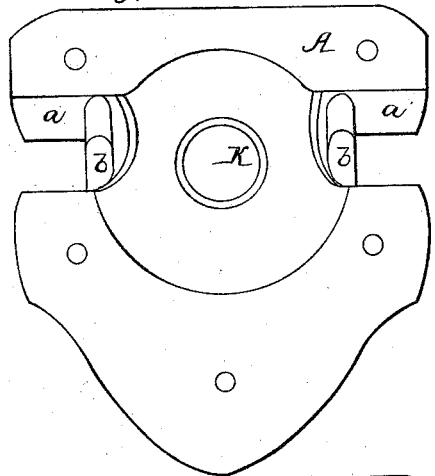

Figure 2, a view of the back of the plate, in elevation.

Figure 3:
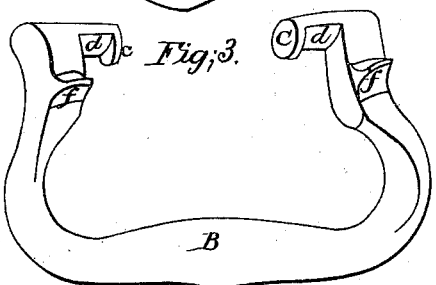

Figure 3, a perspective view of the handle.

Figure 4:
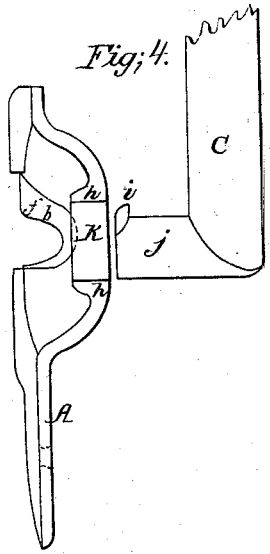

Figure 4, a sectional view of the plate, made on a vertical line through the centre of the eye, showing also, near by, one end of the bail C.

Figure 5:
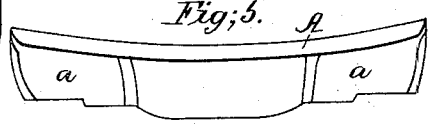

Figure 5, a horizontal view of the plate.

Figure 6:

Figure 6, an edge view of the plate.

The nature of my invention consists in the construction of the eye, in the application of cams to the handle, and in an improved mode of preventing the handles from spreading, arranged and constructed as hereinafter described.

To enable others skilled in the art to make and use my invention, I will proceed to describe its construction and operation.

I make my handles of the metal, and in the form desired, by any well-known means.

The plate A, fig. 1, is made with an eye, $k$, near its centre, in an elevated part of the plate.

The metal which forms the eye extends inward, thereby increasing the wearing-surface, adding to its strength, and forming a raised surface, $n$, fig. 4, for the projection on the bail to work against.

The bail C, fig. 4, is bent at right angles, near each end, for entering the eye and raising the load.

On the end of the wrist $j$ is a projection, $i$, which can extend a part or all of the way around the wrist, the upper part only being needed to keep the bail in.

The bail is readily attached and detached by the operator.

When the bail is detached, the handle projects but a short distance from its fastening, and presents no sharp angles or rough projections liable to fracture, or cause inconvenience in handling.

When these handles are attached to cans, tubs, barrels, &c., these vessels can be easily tipped for emptying, while lifted by the bail, or suspended by the bail, because the handle can turn on the bail in safety.

There is an elevation of the plate at $a\ a$, figs. 1, 2, 5, and 6, formed to stop the handle at a certain height, and to act upon cams $f\ f$, to press the handle out from whatever it is attached to, into its bearings $b\ b$, figs. 2, 4, and 6.

The handle B, fig. 3, is made with cams $f\ f$ on its upper side, of such form, and so located, that as the handle is raised, the cams come in contact with elevations $a\ a$, fig. 1, upon which they slide, and draw the wrists $d\ d$ into their bearings $b\ b$.

These bearings are elevated sufficiently to let the projections $c\ c$, on wrists $d\ d$, easily work behind them. These projections press against the bearings when the handle has a tendency to spread, lessening the liability to injury.

Claims.

1. The handle B, in combination with the plate A, when constructed and arranged as described.

2. The bail C, in combination with the plate A, when constructed in the manner and for the purpose as described.

J. LEWIS JONES.

Witnesses:
W. H. MICKLE,
DEXTER GILLMORE.